Patented July 2, 1929. 1,719,342

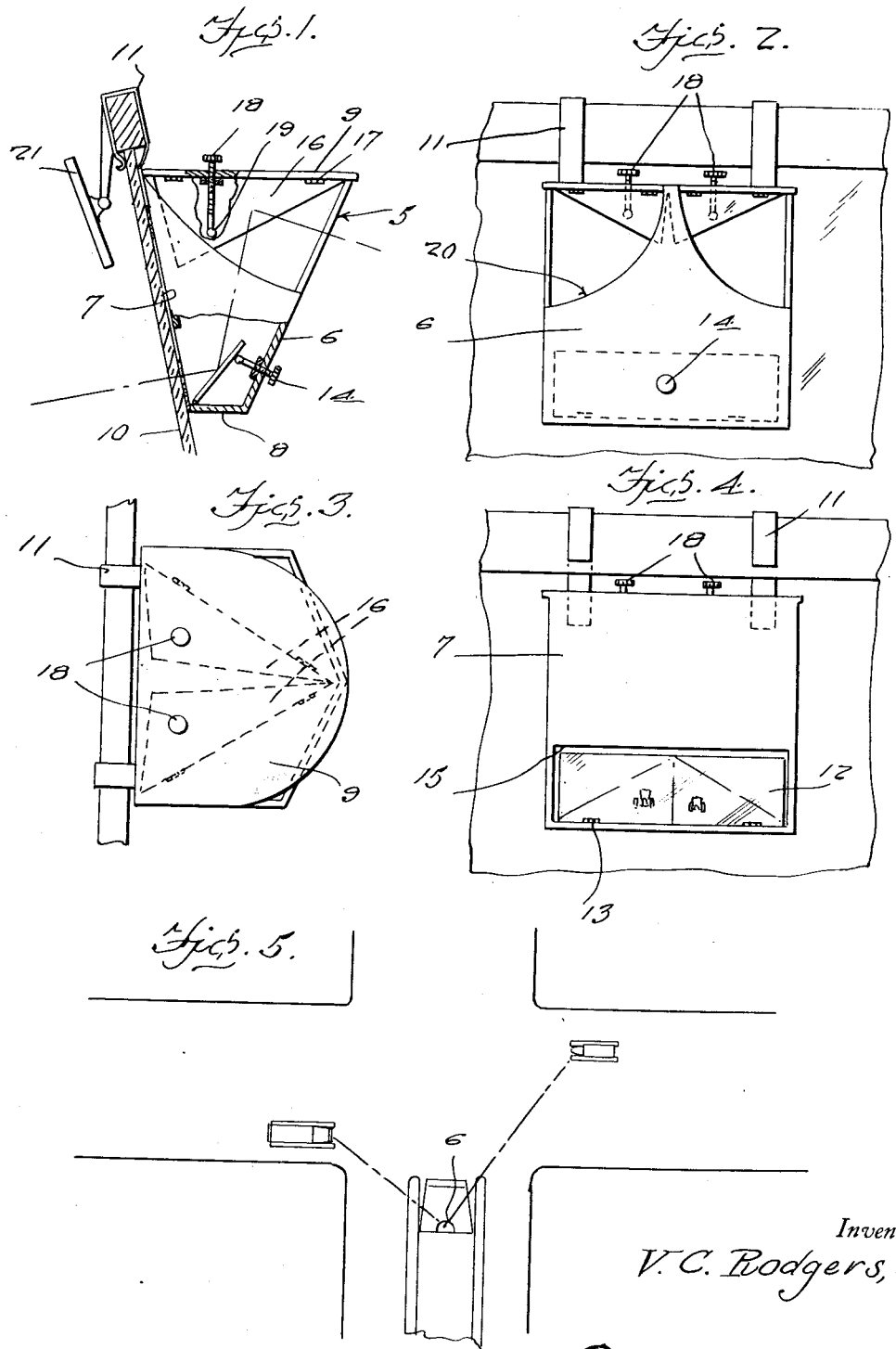

UNITED STATES PATENT OFFICE.

VICTOR COLEMAN RODGERS, JR., OF LAREDO, TEXAS.

MIRROR.

Application filed July 23, 1927. Serial No. 207,941.

My invention relates to mirrors adapted particularly for use with automobiles or similar vehicles and comprising a plurality of reflecting elements which when properly focused or adjusted will enable the driver of the vehicle to observe the approach of another vehicle from either side thereof. The invention is of particular advantage in that it enables the driver to observe the approach of other vehicles at street intersections before the line of said intersection has been reached by the driver.

An object of the invention is to provide a device of the character which may be readily attached to the windshield of a vehicle, which will not obscure the ordinary vision therethrough, which is neat and attractive in appearance, embodying adjusting means for the various mirrors and relatively inexpensive to manufacture and install.

Other objects and advantages reside in the special construction and combination and arrangement of the various elements forming the device as more fully hereinafter described and claimed, reference being had to the accompanying drawing forming part hereof, wherein:

Figure 1 is a vertical sectional view through a windshield showing my invention in attached position thereto, Figure 2 is a front view thereof, Figure 3 is a top plan view thereof, Figure 4 is a view taken from the inside of the windshield, and Figure 5 is a diagrammatic view showing the manner in which approaching vehicles may be observed at a street intersection.

Referring now to the drawings, I have shown my invention comprising a housing 5 of irregular contour and including a front section 6 and rear section 7 converging at their lower ends, a bottom section 8 and a top or cover section 9. The rear section 7 is arranged to rest against the windshield 10 in substantially flush relation and at the upper end thereof I provide a pair of windshield frame attaching clamps 11 preferably composed of spring steel and adapted to be readily attached or detached from said frame. At the lower part of the casing I provide a transversely extending mirror 12 or other reflecting device hingedly connected at its lower ends as at 13 and arranged to have its upper edge vertically adjustable by a set screw 14 extending outwardly from the front edge of the casing. An opening 15 is arranged in the rear side of the casing 7 through which the mirror may be observed by the driver of the car.

A pair of mirrors or other reflecting devices 16 are arranged in the upper section of the casing being hingedly connected along one edge as at 17 to the cover section. The mirrors 16 are of substantially triangular shape arranged with its base section adjacent the windshield and the apex thereof adjacent the front section 6 of the casing. In this manner the reflecting face of the mirror is arranged at substantially right angles with respect to the car and angularly mounted as shown in Figure 3 so as to reflect forwardly thereof. The mirrors 16 being oppositely mounted, it is obvious that the same will be adapted to reflect images appearing at opposite sides of the car.

Adjusting screws 18 are carried in the cover section having their lower ends engaging each of the mirrors 16 whereby to properly adjust the same with respect to the lower mirror 12. A ball and socket connection may be provided between the adjusting screw and the mirror constituting a substantially swivelled connection so as to provide a more efficient adjusting device. A portion of the front section 6 is cut out at each side as indicated at 20 to provide proper vision through the casing.

In Figure 1 of the drawing I have indicated the manner in which a rear view mirror 21 may be mounted in conjunction with my invention.

It is obvious that by properly mounting the mirror upon the windshield of an automobile that the driver may readily observe the approach of cross traffic at street intersections by means of the angular mounting of the respective mirrors. Suitable adjustment of any of the mirrors is possible so as to properly aline the same with the vision of the driver.

It is obvious that the invention is susceptible to various changes in the construction and form without departing from the spirit thereof or the scope of the appended claims and I accordingly claim all such forms of the invention to which I am entitled.

I claim:

1. In a device of the class described, a pair of casings, windshield attaching clips formed thereon, said casings having offset openings at the front and rear sections thereof, a transversely arranged mirror mounted in the casing and disposed adjacent one of said openings and a pair of angularly arranged mirrors mounted in the casing adjacent the other of said openings, the reflecting faces of said angular mirrors being arranged to extend in substantially opposite directions at an inclined angle with respect to said transverse mirror whereby to reflect images thereupon of objects disposed forwardly and at each side of said angular mirrors.

2. In a device of the class described, a mirror casing comprising front and rear sections, said rear section having an opening in the lower portion thereof and said front section having openings in the upper portion thereof, windshield attaching clips disposed in said casing, a mirror transversely arranged in said casing adjacent said lower opening and a pair of mirrors adjustably mounted at the upper end of the casing and arranged to have their reflecting faces disposed in substantially opposite directions and adjacent the openings in said front section of the casing whereby to reflect images upon said lower mirror of objects appearing at opposite sides of the casing.

3. In a device of the class described, a substantially rectangular mirror casing comprising front and rear sections converging toward their lower ends to provide a relatively narrow bottom section, side sections and a cover section, said rear section having an opening extending transversely along its lower edge and said side and front sections having their adjacent upper edges cut away to provide a pair of openings, each opening including a portion of the front section and a portion of one of the side sections in its area, windshield clamping means carried by said rear section, a pair of mirrors hingedly connected to said cover section with their hinged edges extending diagonally forwardly toward each other with their reflecting surfaces exposed to objects appearing through said upper openings from directions forwardly and at each side of the casing and adapted to reflect the images thereof downwardly in the casing and a mirror arranged at the bottom of the casing adjacent said lower opening and adapted to reflect the images from the upper mirrors rearwardly therethrough.

4. In a device of the character described, a mirror casing comprising front and rear sections converging toward their lower ends and having an opening in the lower portion of said rear section and a pair of openings at opposite sides in the upper portion of said front section, a cover section for the casing, clamping means carried by the casing and adapted to attach the same to the windshield of an automobile, the mirror hingedly mounted in the lower portion of said casing adjacent the opening in the rear section thereof, and arranged transversely of the casing, a pair of mirrors hingedly connected at one edge to said cover section and arranged to have their respective faces disposed to objects appearing in the openings in said front section from substantially opposite directions, and adjustable means for each of the mirrors whereby to focus both of said upper mirrors upon separate portions of the reflecting surface of said lower mirror.

In testimony whereof I affix my signature.

VICTOR COLEMAN RODGERS, Jr.